Figure 1:
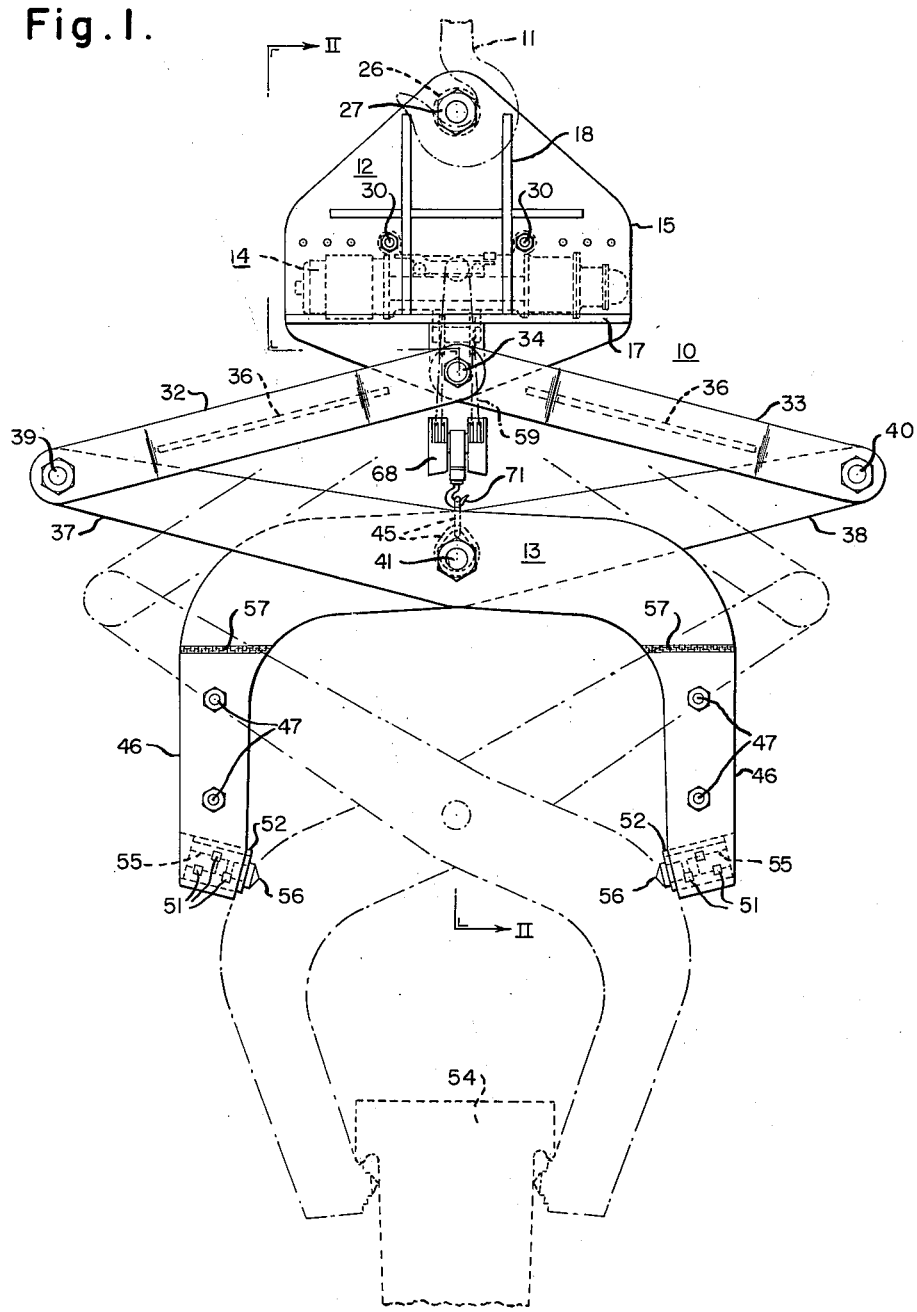

May 23, 1961  D. L. JANOFF  2,985,481
ADJUSTABLE OPENING TONGS
Filed May 29, 1957  2 Sheets-Sheet 1

INVENTOR
Daniel L. Janoff

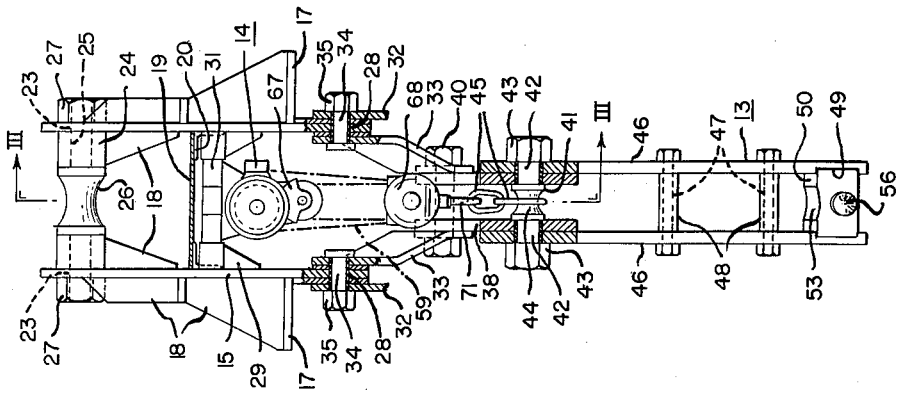
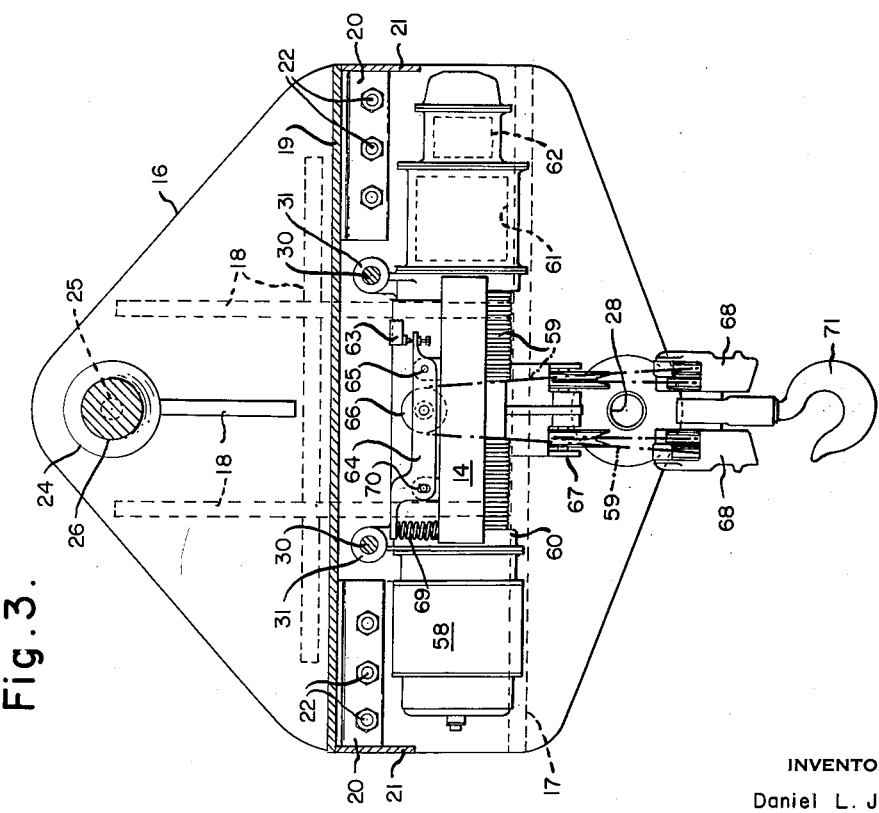

United States Patent Office 2,985,481
Patented May 23, 1961

2,985,481

ADJUSTABLE OPENING TONGS

Daniel L. Janoff, Mount Lebanon Township, Allegheny County, Pa., assignor to Heppenstall Company, Pittsburgh, Pa., a corporation of Pennsylvania Filed May 29, 1957, Ser. No. 662,367

8 Claims. (Cl. 294—86)

This invention relates to a new tongs in which the opening thereof may be adjusted for positioning to correspond to the size of the load to be lifted. More particularly, my invention pertains to a new combination of link-and-lever tongs having a regulable hoist element to adjust the distance between principal pivotal centers and thereby provide a selected opening of the tongs.

A prior kind of link-and-lever tongs is shown in United States Patent No. 1,839,389 and will serve to illustrate advantages of the instant invention. Thus, as the patented tongs device is raised by means of a crane hook, the central pivots will separate vertically to close the tongs upon a workpiece provided that the tongs latch mechanism has been opened. Such closing, moreover, will be from the full-open position of the patented tongs and which had actually been rested, immediately prior to such raising, upon a solid object such as the workpiece in order to cause such opening of the latch mechanism. After closing upon a workpiece and transporting it to whatever location is desired, the latch mechanism is relocked when the patented tongs is brought to full-open position by again bringing it to rest on the workpiece. Hence, the next raising of the tongs will lift the patented tongs off the workpiece in locked-open position. The alternate unlocking will not occur until the tongs is rested still again upon a solid object to ready the tongs for another lifting operation. It will therefore be apparent that the patented tongs must be successively rested upon a solid object respectively to open and close the latch mechanism, that the opening of the latch mechanism pursuant to which such tongs can engage in a lifting operation occurs only after every other such rest and that the patented tongs when being positioned over a workpiece to be handled or lifted is always in its substantially full-open latch-engaged position.

In the device of this invention those difficulties of the patented device and other devices incorporating principles of the patented device, have been overcome. In the instant invention the tongs may be opened to whatever particular distance is required to accommodate positioning relative to the object to be engaged and handled. That selected opening adjustment may be made whether or not the new tongs is in motion and whether or not the new tongs is rested upon any solid object because it does not require such letting down to prepare it for the next phase of any operation thereof. Further, the possibility of damage to a workpiece or other object to be handled by the new tongs is inhibited since it is not necessary for the weight of the tongs to rest on such workpiece or object in the course of any operation thereof. The new adjustable opening tongs of this invention saves time and handling in that it does not have to be opened any farther than required to embrace the size of a workpiece of present concern and is regulatable successively to different selected openings as may be required or desired.

Other objects, features and advantages will be apparent from the following description and from the accompanying drawings, which are illustrative of one embodiment only in one field of use, in which Figure 1 is a front view of one embodiment of this invention suitable for use, for example, in a steel mill;

Figure 2 is a view of the tongs embodiment shown in Figure 1 taken along line II—II of Figure 1; and Figure 3 is a view of the head and hoist elements of the new tongs shown in Figures 1 and 2 taken generally along line III—III of Figure 2 with link and lever members removed and the hoist element in its uppermost position.

Referring to the drawings, a new tongs 10 is illustrated in a form adapted to be suspended as from a hook 11 of a crane or other materials handling equipment in a steel or other mill or plant having use for a tongs of this invention. Tongs 10 comprises a head element 12, a link-and-lever body element 13 pivotally connected to said head and a hoist element 14 extending between said head and said body to adjust the successive openings of said tongs to the predetermined extents desired respectively.

As shown, head 12 comprises vertically extending horizontally spaced front and back supporting frame members 15 and 16 respectively. Outrigger stands 17 and strengthening plates 18 are welded to the frame members 15 and 16, such stands 17 having undersurfaces which can be used to rest on the edges of a rack or pit when tongs 10 is to be stored. A frame connecting plate 19 is provided with depending angles 20 welded to the underside thereof at the outer ends of its front and back edges and with end skirts 21 similarly welded to connecting plate 19. Nut and bolt subassemblies 22 extending through registering openings in the members 15 and 16 and the respective flanges of the respective angles 20 enable the connecting plate member 19 to be rigidly incorporated as a part of head 12, the fore and aft depth of plate 19 acting as a spacer between the frame members 15 and 16.

In the center of the upper portion members 15 and 16 of head 12, holes 23 are drilled in axial registry and provided with welded collars 24 to receive the threaded ends 25 of a necked suspension pin 26 adapted to be engaged by hook 11. Nuts 27 rigidly fasten suspension pin 26 in place. The lower portions of the respective frame members 15 and 16 are provided with bushed openings 28 in axial registry. The axis of pin 26 and of the openings 28 lie in the median vertical fore and aft plane through the center of tongs 10 when it is suspended as shown in Figure 1. Internal facing supports 29, on members 15 and 16, to each side of said median fore and aft plane are provided with openings in axial registry with each other and with like openings through ears 31 in the casing of hoist element 14 so as to fasten hoist 14 centrally and within head 12 for the passage of threaded holding bolts 30 fastened in place by nuts.

A pair of spaced right-hand links 32 and a further pair of spaced left-hand links 33 are respectively pivotally connected to said front and back frame supporting members 15 and 16 by link or head pivots 34 extending respectively through registering openings in the upper ends of said links and said bushed openings 28, nuts 35 being used to fasten the head pivots 34 in place. The respective right-hand and left-hand link pairs generally diverge laterally and downwardly from the axis of the head pivots 34 as shown in Figure 1. Link connector plates 36 are respectively welded to the links in each pair forming a rigid connection in each case and serving also as heat shields when tongs 10 is to be used to handle hot ingots, slabs, billets or other hot solid metal.

A pair of spaced right-hand generally L-shaped tong levers 37 and a left-hand such pair of tong levers 38 are respectively pivotally connected at 39 and 40 respectively to the lower ends of the link pairs 32 and 33. The tong levers in each pair at the front and back thereof cross at the median fore and aft plane and are there provided with a connecting lever pivot 41. Pivot 41 is in the form of a stud having outwardly extending threaded ends 42 which pass through bushed openings respectively in the front and back members of the respective pairs of tong levers, nuts 43 acting to secure lever pivot 41 in position. The central portion 44 of lever pivot 41 is in the form of a spool adapted to be engaged by coupling links 45 so that as hoist 14 is raised, tong arms 46 on the lower portions of the respective pairs of levers 37 and 38 will be opened as the distance between head pivot 34 and lever pivot 41 is decreased. Conversely, as hoist 14 is operated to lower pivot 41, relative to the head 12, the tong arms 46 will be moved toward each other until the selected spacing therebetween is reached which equals the desired opening therefor.

In the illustrated embodiment, the front and back tong arms 46 to each side of the median fore and aft plane are rigidly connected together by bolt and nut assemblies 47, spacer sleeves 48 being used over the bolts to insure maintenance of the spacing between the respective arms in each pair of tong levers. The facing side of each of the spaced pairs of tong arms 46 are undercut at 49 to receive a socket 50 which fits therein and is affixed thereto by bolts 51. The respective sockets 50 extend inwardly of the inner edges of the tong arms and provide projections 52 which may be recessed at 53 so that, if desired, the ears of a mold 54 like a steel mill ingot mold may rest upon projections 52 and be carried thereby. In addition, each socket 50 is bored at 55 for a tong point 56, such tong points independently providing sufficient pressure upon engagement with an object to hold it to be lifted, turned or otherwise handled by closed tongs 10. Where any such turning of the object handled is to be involved, the tongs 10 may have marker strips 57 welded to the faces of the respective tong arms 46 to indicate the uppermost level to be reached by the top of any ingot, mold, hot top or other object handled so that such object may be turned with clearance for its front or back edge. In such handling, hoist 14 does not bear the burden of such object or workpiece since the working load of tongs 10 is transmitted through its frame members, links and levers rather than through the parts of hoist 14.

As shown, hoist 14 is a standard form of commercial hoist. Therein, an electric motor 58 is operated in a selected raising or lowering direction by a controller located, for example, in the cab of the crane having hook 11, the motor 58 being connected to such controller by suitable insulated flexible conductors (not shown). Motor 58 preferably has dynamic braking components so that in the paying out of cable 59 from winding drum 60 in hoist 14 in the course of a lowering movement to narrow the opening between the opposed tong arms 46 and points 56, a drag is imposed on the cable to prevent it from moving faster than a predetermined rate. At the opposite end of hoist 14, there is a brake 61 which, in the illustrated type of hoist, is applied automatically to hold drum 60 when motor 58 stops, unless and until a brake release coil 62 is energized. Whenever coil 62 is energized with motor 58 stopped, it releases brake 61 and allows winding drum 60 to turn and pay out cable 59 to relieve strain thereon. A switch 63 of a fast-acting small-travel microswitch type is provided with dual contacts, one set in a power circuit to motor 58 being normally closed and another set in a power circuit to brake release coil 62 being normally open.

A transversely extending rockable bracket 64 is pivoted at 65 to the casing of hoist 14 and has a pulley 66 rotatably mounted thereon. Cable 59 is symmetrically dead-ended on winding drum 60 to each side of the median fore and aft plane and is symmetrically reeved around head block pulleys 67 and the pulleys in a lower block 68, with cable 59 crossing over pulley 66 in passing from one side to the other. A spring 69 normally urges bracket 64 about pivot 65 in a clockwise direction as viewed in Figure 3, the extent of movement of bracket 64 being limited by slot 70. When under the influence of spring 69 so that the left-hand end of bracket 64 as shown in Figure 3, is upward, the contacts in switch 63 are in their normal condition relative to motor 58 and coil 62. A hoist hook 71 depends from block 68 and in turn is in hooked engagement with the links 45 for the purpose of adjusting the opening between tong points 56 to the successively selected extents. The capacity strength of hoist 14 is selected, preferably, so as to be sufficient to move the head and lever pivots relative to one another when the tong levers 32 and 33 are not in load-bearing engagement with a load, but insufficient to move such pivots toward one another when such tong levers are in load-bearing engagement with a load.

In one illustrative operation sequence, let it be assumed that tongs 10 is suspended from hook 11 and held by its hoist element 14 in an intermediate open position, as shown in solid lines in Figure 1, which enabled hook 11 to lift tongs 10 away from the last job handled without resting the tongs on any solid object.

Let it be assumed further it is desired next to pick up ingot mold 54. In that case the crane operator without operating hoist 14 to change the opening of the empty tongs 10 may move head 12 into the position shown in Figure 1, or he may lower hoist 14 during the movement of hook 11 and tongs 10 to a position adjacent the mold 54 to narrow the tongs opening to more closely approximate the clearance needed to pass by the ears of mold 54 and engage it for handling. When the opening is left as shown in such solid lines, the operator will stop hook 11 and head 12 in the Figure 1 position and turn his hoist controller on to release brake 61 and to simultaneously energize motor 58 to turn winding drum 60 in a lowering direction preferably as fast as possible causing lever pivot 41 to separate from head pivots 34 so that tong points 56 will engage and make an initial bite into the sides of mold 54 beneath the ears thereof as shown in dash-and-dot lines in Figure 1. The operator will then shut off the hoist controller, thereby applying brake 61 to drum 60, and raise hook 11 thereby raising tongs 10 and causing points 56 to grip mold 54 harder. In such lifting of hook 11 and head 12, the distance between the respective pivots 34 and 41 will tend to increase and will begin to place a strain upon cable 59 causing bracket 64 to move in a counterclockwise direction about pivot 65 as viewed in Figure 3. Such movement of bracket 64 will operate switch 63 to open the circuit through it to motor 58 and to close a circuit through it to coil 62 so that brake 61 will be momentarily released sufficiently to relieve such strain by the paying out of additional cable. And, if the crane operator should accidentally move the hoist controller to a hoist raising direction while tongs 10 is handling a load like mold 54, hoist 14 would be ineffectual since cable 59 would tend to become strained by virtue of such load to a predetermined extent which would cause bracket 64 to move in a counterclockwise direction and operate switch 63. Upon the setting down of the mold 54 on some solid support the tongs 10 would be initially slacked by such setting down and the crane operator would then energize hoist 14 to raise block 68 to open tongs 10 at least to the extent needed for separation thereof from the load, whereupon the crane operator would shut off the hoist controller causing brake 61 to be applied automatically. Hence, it is evident that a tongs may, by means of my invention, have its opening adjusted when and as often as needed or desired to any extent between its maximum opening and its minimum opening positions.

It is clear that my invention may be used in a variety of fields and that the objects to be carried or handled may have a variety of shapes with tong arms correspondingly shaped to facilitate such carrying or handling. Moreover, it is obvious that although the illustrated embodiment shows one type of tongs and one type of hoist element embodied in the such tongs, other types of tongs and hoist elements may be utilized and that various circuits for such hoist elements may be provided. And, various other modifications in the illustrated embodiment and in parts of the illustrated embodiment may be made without departing from the spirit of my invention or the scope of the appended claims.

I claim:

1. In an adjustable opening tongs, apparatus comprising, in combination, a head having vertically extending spaced front and back supporting frame members, a suspension pin extending between said members adjacent the upper portion thereof, respective front and back head pivots supported by said front and back frame members respectively, said head pivots having a common axis parallel to and vertically below the axis of said suspension pin, a pair of spaced right-hand links respectively pivotally connected to said front and back frame members about said respective head pivots, a pair of spaced left-hand links respectively pivotally connected to said front and back frame members about said respective front and back head pivots, said respective pairs of links being generally divergent laterally and downwardly from the axis of said head pivots, a pair of spaced right-hand generally L-shaped front and back tong levers respectively pivotally connected at the upper ends thereof to the lower ends of said right-hand pair of links, a pair of spaced left-hand generally L-shaped front and back tong levers respectively pivotally connected at the upper ends thereof to the lower ends of said left-hand pair of links, said pairs of tong levers being respectively rigidly connected together by connecting plates and crossing vertically below said head pivots, the lower ends of said pairs of tong levers extending generally vertically to act as inwardly facing opposed tong arms, a lever pivot for all said levers at said crossing and having its axis parallel to and vertically below said axes of said suspension pin and head pivots, a spool member in the space between said respective front and back levers and having an axis coincident with the axis of said lever pivot, inwardly extending opposed tong points and socket projections rigidly connected to the lower portions of said respective pairs of tong arms, a transversely extending hoist having a casing rigidly connected to said front and back frame members in the space between the same and further between said suspension pin and said head pivots, a winding drum and a lower block in said hoist, a cable extending between said winding drum and block and adapted to raise and lower said block dependent upon the direction of rotation of said drum, a rockable bracket pivotally connected to said casing, a pulley rotatably connected to said bracket and having said cable reeved thereover, a motor in said hoist adapted to receive electrical energy to rotate said drum at least in a cable raising direction, a switch for said motor adapted to be actuated by said bracket when said cable is strained to a predetermined extent insufficient to hold said tongs plus a load engaged by said tong points, means to normally urge said bracket away from operative actuation of said switch, connecting means extending between said block and said spool member, and means in said hoist to pay out said cable as the distance between said head pivots and lever pivot increases in the course of a tongs operation caused by a lifting of said suspension pin, whereby said hoist is operable when said tongs is not bearing a load to adjust the opening between said tong points.

2. In an adjustable opening tongs, apparatus comprising, in combination, a head having spaced front and back supporting frame members, a suspension pin fastened to the upper portion of said head, respective front and back head pivots supported by said head, said head pivots having a common axis parallel to and vertically below the axis of said suspension pin, a pair of spaced right-hand links respectively pivotally connected to said front and back frame members about said respective head pivots, a pair of spaced left-hand links respectively pivotally connected to said front and back frame members about said respective head pivots, said respective pairs of links being generally divergent laterally and downwardly from the axis of said head pivots, a pair of spaced right-hand tong levers respectively pivotally connected at the upper ends thereof to the lower ends of said right-hand pair of links, a pair of spaced left-hand tong levers respectively pivotally connected at the upper ends thereof to the lower ends of said left-hand pair of links, said pairs of tong levers being respectively rigidly connected together and crossing vertically below said head pivots, the lower ends of said pairs of tong levers comprising opposed tong arms, a lever pivot for said levers having its axis parallel to and vertically below said axes of said suspension pin and head pivots, a transversely extending hoist rigidly connected to said front and back frame members in the space between the same and below said suspension pin, a winding drum and a pulley block in said hoist, a cable extending between said winding drum and block and adapted to raise and lower said block dependent upon the direction of rotation of said drum, a movable member in said hoist, a pulley rotatably connected to said movable member and having said cable reeved thereover, a motor in said hoist adapted to receive electrical energy to rotate said drum at least in a cable raising direction, a switch for said motor adapted to be actuated by said movable member when said cable is strained to a predetermined extent insufficient to support a load engaged by said tong points, means to normally urge said movable member away from operative acuation of said switch, connecting means extending between said block and said lever pivot whereby said hoist will not control the opening of said tongs when bearing a load, and means in said hoist to pay out said cable as the distance between said head pivots and lever pivot increases in the course of a tongs load lifting operation caused by a lifting of said suspension pin.

3. In an adjustable opening tongs, apparatus comprising, in combination, a head having a suspension member, a head pivot mounted in said head below said suspension member, a right-hand link pivotally connected to said head pivot, a left-hand link pivotally connected to said head pivot, said links being generally divergent laterally and downwardly from said head pivot, a right-hand tong lever pivotally connected at the upper end thereof to the lower end of said right-hand link, a left-hand tong lever pivotally connected at the upper end thereof to the lower end of said left-hand link, said tong levers crossing vertically below said head pivot, the lower ends of said tong levers having tong arms adapted to handle a load, a lever pivot for said tong levers at said crossing below said head pivot, a hoist mounted in said head, a winding drum and a pulley block in said hoist, said block being connected to said lever pivot, a cable extending between said winding drum and block and adapted to raise said block upon the rotation of said drum in a cable raising direction, a motor in said hoist adapted to rotate said drum at least in a cable raising direction to move said pivots to a selected position relative to one another, means to stop said motor and to hold said drum when said selected position is reached, and means cooperating with said hoist to relieve a predetermined strain upon said cable when said tong arms are operatively engaging a load.

4. An adjustable opening tongs comprising, in combination, a head adapted to be moved by other equipment, head pivot means positioned in said head, links pivotally connected to said head pivot means, said respective links extending laterally relative to said head, tong levers pivotally connected at the upper ends thereof to the lower ends of said links respectively, said tong levers crossing below said head means, the lower ends of said tong levers having tong arms adapted to handle a load, a lever pivot for said tong levers at said crossing, and a powered hoist unit secured to said head, said hoist unit being operatively connected to said lever pivot to control at least the raising of the same relative to said head, and automatic means to render said hoist ineffective to change the position of said tong levers when said tongs is subjected to a load.

5. A tongs comprising, in combination, a head having a member by means of which said tongs may be suspended, link pivot means mounted in said head, rigid divergent links pivoted to said link pivot means, rigid levers having a crossing position, lever pivot means connecting said levers at said crossing position, opposed tong arms carried by said levers and adapted to engage a load, said links and levers further being pivotally connected together at the respectively adjacent transversely outer ends thereof to provide load-carrying mechanism in which the distance between said tong arms is opened when said pivot means are moved relatively toward one another and is closed when said pivot means are moved relatively away from one another, and self-contained cable hoist means supported by said head for moving said pivot means relative to one another to a selected extent between the extremes of the possible movement thereof to control the opening between said tong arms when said tong arms are not in engagement with a load, and automatic means to render said hoist means ineffective when said tong arms are in engagement with a load.

6. In a load-lifting tongs to be suspended, apparatus comprising, in combination, a head, laterally and outwardly extending links pivotally connected to said head, laterally and inwardly extending levers pivotally connected to said links in spaced relation to said head, load-engaging members supported by said levers to move therewith, a further pivotal member connected to said levers and load-engaging members whereby the distance between said load-engaging members is changed in accordance with the distance between said further pivotal member and said head, substantially vertical cable hoist mechanism supportably connected between said head and said further pivotal member, said hoist mechanism having a prime mover therewith, means in said mechanism normally to hold said hoist mechanism against movement when said prime mover is de-energized, and automatic means operatively connected to said hoist mechanism to pay out cable upon said cable becoming strained to a predetermined extent when a load is lifted by said head, links, levers and load-engaging members.

7. A tongs as set forth in claim 5 in which said automatic means are operatively connected to said hoist means and automatically pay out cable of said cable hoist means upon a tensioning of said cable to a predetermined extent caused by a loading by said tongs.

8. An adjustable opening suspendable tongs comprising, in combination, a link pivot upper member, rigid generally laterally extending links pivoted to said upper member, rigid crossing levers pivoted to a lever pivot lower member below said upper member, said links and levers further being pivotally connected together at the respectively adjacent ends thereof to provide a pivoted parallelogram mechanism to move said tongs in an opening direction when said members are moved relatively toward one another and to move said tongs in a closing direction when said members are moved relatively away from one another, a self-contained hoist mounted on said tongs and operatively connecting said members and adapted to regulate the vertical distance between said members in the course of such relative movement to a selected extent when said tongs is not handling a load, a prime mover in said hoist adapted to be actuated to move said members relatively at least toward one another in the course of a reduction in said vertical distance, means normally operative following such a relative movement of said members to hold the selected vertical distance therebetween provided by said last-mentioned relative movement, and automatic means to render said hoist ineffective to change the position of said tong levers when said tongs is subjected to a load.

References Cited in the file of this patent

UNITED STATES PATENTS

| | | |
|---|---|---|
| 482,861 | Burns | Sept. 20, 1892 |
| 505,065 | Shaw | Sept. 12, 1893 |
| 505,067 | Shaw | Sept. 12, 1893 |
| 549,321 | Laurent | Nov. 5, 1895 |
| 846,837 | Evans | Mar. 12, 1907 |
| 852,897 | Niedermier | May 7, 1907 |
| 890,163 | Myers et al. | June 9, 1908 |
| 1,439,245 | Knapp | Dec. 19, 1922 |
| 2,362,268 | Hall | Nov. 7, 1944 |
| 2,445,228 | Le Tourneau | July 13, 1948 |
| 2,573,997 | Souza | Nov. 6, 1951 |

FOREIGN PATENTS

| | | |
|---|---|---|
| 1,098,910 | France | Mar. 16, 1955 |
| 546,853 | Germany | Mar. 22, 1932 |

UNITED STATES PATENT OFFICE
CERTIFICATE OF CORRECTION

Patent No. 2,985,481            May 23, 1961

Daniel L. Janoff

It is hereby certified that error appears in the above numbered patent requiring correction and that the said Letters Patent should read as corrected below.

Column 6, line 75, after "head" insert -- pivot --; column 7, line 22, strike out "and".

Signed and sealed this 24th day of October 1961.

(SEAL)
Attest:

ERNEST W. SWIDER
Attesting Officer

DAVID L. LADD
Commissioner of Patents